United States Patent
Qin et al.

(10) Patent No.: US 12,168,705 B2
(45) Date of Patent: Dec. 17, 2024

(54) MODIFIED HIGH CIS POLYDIENE POLYMER, RELATED METHODS AND RUBBER COMPOSITIONS

(71) Applicant: Bridgestone Corporation, Chuo-ku (JP)

(72) Inventors: Zengquan Qin, Brentwood, TN (US); Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 637 days.

(21) Appl. No.: 17/438,072

(22) PCT Filed: Mar. 10, 2020

(86) PCT No.: PCT/US2020/021864
§ 371 (c)(1),
(2) Date: Sep. 10, 2021

(87) PCT Pub. No.: WO2020/185761
PCT Pub. Date: Sep. 17, 2020

(65) Prior Publication Data
US 2022/0185931 A1 Jun. 16, 2022

Related U.S. Application Data

(60) Provisional application No. 62/816,130, filed on Mar. 10, 2019.

(51) Int. Cl.
| | | |
|---|---|---|
| C08F 8/30 | (2006.01) | |
| B60C 1/00 | (2006.01) | |
| C08F 4/54 | (2006.01) | |
| C08F 236/06 | (2006.01) | |
| C08K 3/04 | (2006.01) | |

(52) U.S. Cl.
CPC .......... *C08F 236/06* (2013.01); *B60C 1/0016* (2013.01); *C08F 4/545* (2013.01); *C08F 8/30* (2013.01); *C08K 3/04* (2013.01); *C08F 2438/00* (2013.01); *C08F 2810/40* (2013.01)

(58) Field of Classification Search
CPC . C08F 8/30; C08F 236/06; C08F 4/54; C08K 4/54; B60C 1/00
USPC ........................................................ 524/526
See application file for complete search history.

(56) References Cited

U.S. PATENT DOCUMENTS

| | | |
|---|---|---|
| 3,297,667 A | 1/1967 | von Dohlen et al. |
| 3,311,596 A | 3/1967 | Berding et al. |
| 4,222,882 A | 9/1980 | Brulet et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,487,892 A | 12/1984 | Ohmori et al. |
| 4,533,711 A | 8/1985 | Takeuchi et al. |
| 4,575,538 A | 3/1986 | Hseih et al. |
| 4,663,405 A | 5/1987 | Throckmorton |
| 4,696,984 A | 9/1987 | Carbonaro et al. |
| 4,710,553 A | 12/1987 | Carbonaro et al. |
| 4,736,001 A | 4/1988 | Carbonaro et al. |
| 4,906,706 A | 3/1990 | Hattori et al. |
| 4,929,679 A | 5/1990 | Akita et al. |
| 4,990,573 A | 2/1991 | Andreussi et al. |
| 5,001,196 A | 3/1991 | Kawanaka et al. |
| 5,064,910 A | 11/1991 | Hattori et al. |
| 5,115,006 A | 5/1992 | Watanabe et al. |
| 5,216,080 A | 6/1993 | Suzuki et al. |
| 5,219,942 A | 6/1993 | Suzuki et al. |
| 5,268,413 A | 12/1993 | Antkowiak et al. |
| 5,312,849 A | 5/1994 | Akita et al. |
| 5,536,801 A | 7/1996 | Antkowiak et al. |
| 5,567,784 A | 10/1996 | Wieder et al. |
| 5,622,926 A | 4/1997 | Schade et al. |
| 5,844,050 A | 12/1998 | Fukahori et al. |
| 5,902,856 A | 5/1999 | Suzuki et al. |
| 5,932,662 A | 8/1999 | Lawson et al. |
| 6,255,416 B1 | 7/2001 | Sone et al. |
| 6,319,990 B1 | 11/2001 | Spence et al. |

(Continued)

FOREIGN PATENT DOCUMENTS

| | | |
|---|---|---|
| CN | 1592760 A | 3/2005 |
| CN | 104603056 A | 5/2015 |

(Continued)

OTHER PUBLICATIONS

International Preliminary Report on Patentability from PCT application PCT/US2020/021864, dated Aug. 25, 2021.
Written Opinion from PCT application PCT/US2020/021864, dated Jul. 3, 2020.
International Search Report from PCT application PCT/US2020/021864, dated Jul. 3, 2020.
Extended European Search Report and Search Opinion from counterpart application EP20769546, dated Dec. 5, 2021.

(Continued)

*Primary Examiner* — Deve V Hall
(74) *Attorney, Agent, or Firm* — Meredith E. Hooker; Jenny L. Sheaffer

(57) ABSTRACT

Disclosed herein are a modified high cis polydiene polymer, processes for preparing the modified high cis polydiene polymer, and tire rubber compositions containing the modified high cis polydiene polymer. The processes make use of a functionalizing compound of formula I or formula II and a coupling agent to prepare the modified high cis polydiene polymer from a quantity of conjugated diene monomer polymerized using a lanthanide-based catalyst system. The modified high cis polydiene polymer includes at least one polymer chain having a residue from the functionalizing compound and a residue from the coupling agent and can be utilized in tire rubber compositions in combination with other ingredients such as fillers.

20 Claims, No Drawings

(56) References Cited

U.S. PATENT DOCUMENTS

| | | |
|---|---|---|
| 6,333,375 B1 | 12/2001 | Nakamura et al. |
| 6,437,205 B1 | 8/2002 | Miller et al. |
| 6,482,930 B1 | 11/2002 | Kwag et al. |
| 6,515,087 B2 | 2/2003 | Hsu et al. |
| 6,521,726 B1 | 2/2003 | Kimura et al. |
| 6,897,270 B2 | 5/2005 | Ozawa et al. |
| 7,008,899 B2 | 3/2006 | Luo et al. |
| 7,055,566 B2 | 6/2006 | Abiani et al. |
| 7,094,849 B2 | 8/2006 | Luo et al. |
| 7,288,611 B2 | 10/2007 | Jiang et al. |
| 7,396,889 B2 | 7/2008 | Robert |
| 7,642,322 B2 | 1/2010 | Ozawa et al. |
| 7,741,418 B2 | 6/2010 | Luo et al. |
| 7,767,755 B2 | 8/2010 | Yan |
| 7,781,533 B2 | 8/2010 | Ozawa et al. |
| 7,825,201 B2 | 11/2010 | Luo et al. |
| 7,902,309 B2 | 3/2011 | Luo et al. |
| 8,017,695 B2 | 9/2011 | Luo et al. |
| 8,314,189 B2 | 11/2012 | Luo et al. |
| 8,642,705 B2 | 2/2014 | Ozawa et al. |
| 8,765,887 B2 | 7/2014 | Luo |
| 9,255,158 B2 | 2/2016 | Lawson et al. |
| 9,447,213 B2 | 9/2016 | Luo |
| 10,730,985 B2 | 8/2020 | Yan et al. |
| 11,161,927 B2 | 11/2021 | Yan et al. |
| 11,807,704 B2 | 11/2023 | Yan et al. |
| 2002/0061980 A1 | 5/2002 | Hsu et al. |
| 2007/0054995 A1 | 3/2007 | Hogan et al. |
| 2007/0293622 A1 | 12/2007 | Yan |
| 2009/0229729 A1 | 9/2009 | Woloszynkek et al. |
| 2011/0146877 A1 | 6/2011 | Tanaka et al. |
| 2012/0029234 A1 | 2/2012 | Woloszynkek et al. |
| 2013/0261252 A1 | 10/2013 | Nebhani |
| 2014/0039080 A1 | 2/2014 | Amamoto et al. |
| 2015/0119493 A1 | 4/2015 | Steinhauser et al. |
| 2015/0252133 A1 | 9/2015 | Morita et al. |
| 2015/0252172 A1 | 9/2015 | Bolvia et al. |
| 2016/0083495 A1 | 3/2016 | Steinhauser et al. |
| 2016/0083496 A1 | 3/2016 | Matsuyama et al. |
| 2016/0152756 A1 | 6/2016 | Lawson et al. |
| 2016/0237259 A1 | 8/2016 | Hardy et al. |
| 2018/0171053 A1* | 6/2018 | Yan .................. C08L 15/00 |
| 2018/0244103 A1 | 8/2018 | Charsom et al. |
| 2018/0282446 A1 | 10/2018 | Uenishi et al. |

FOREIGN PATENT DOCUMENTS

| | | |
|---|---|---|
| EP | 0818478 A1 | 1/1998 |
| EP | 1939221 A2 | 7/2008 |
| EP | 2015538 A2 | 7/2008 |
| EP | 3053934 A1 | 1/2009 |
| EP | B118251 A1 | 8/2016 |
| EP | 3351563 A1 | 7/2018 |
| JP | 2009-221203 A | 10/2009 |
| JP | 2009-242788 A | 10/2009 |
| JP | 2014-172957 A | 9/2014 |
| JP | 2018-514639 A | 6/2018 |
| WO | 95-04090 A1 | 2/1995 |
| WO | 2012091753 A1 | 5/2012 |
| WO | 2014-149931 A1 | 9/2014 |
| WO | 2016-106409 A1 | 6/2016 |
| WO | 2017-043553 A1 | 3/2017 |
| WO | 2018-088919 A1 | 5/2018 |
| WO | 2019-118688 A1 | 6/2019 |

OTHER PUBLICATIONS

International Search Report from PCT application PCT/US2018/065388 dated Apr. 1, 2019.
Written Opinion from PCT application PCT/US2018/065388 dated Apr. 1, 2019.
European search report for EP application 18887568.6, report dated Aug. 20, 2021.
Hsieh, H.L. et al., "Polymerization of Butadiene and Isoprene with Lanthanide Catalysts Characterization and Properties of Homopolymers and Copolymers," Rubber Chemistry & Technology, vol. 58 (1985), pp. 5903-5908.
Shen, Z., et al., "The Characteristics of Lanthanide Coordination Catalysts and the cis-Polydienes Prepared Therewith," Journal of Polymer Science: Polymer Chemistry Edition, vol. 18 (1980), pp. 3345+.
Quirk, R.P., et al., "Butadiene Polymerization Using Neodymium Versatate-Based Catalysts: Catalyst Optimization and Effects of Water and Excess Versatic Acid," Polymer, vol. 41 (2000), pp. 5903-5908.
Friebe, L. et al., "Neodymium Based Zieger Catalysts-Fundamental Chemistry," Advances in Polymer Science, vol. 204 (2006), pp. 1-154.
Zhang, Z., "Polymerization of 1,3-Conjugated Dienes with Rare Earth Metal Precursors," Structural Bond., vol. 137 (2010), pp. 49-108.

* cited by examiner

MODIFIED HIGH CIS POLYDIENE POLYMER, RELATED METHODS AND RUBBER COMPOSITIONS

This application is a national stage application of PCT/US2020/021864 filed on Mar. 10, 2020, which claims the benefit of U.S. Provisional Application Ser. No. 62/816,130 filed on Mar. 10, 2019, which are incorporated herein by reference in their entirety.

FIELD

The present application is directed to a modified high cis polydiene polymer, related methods and tire rubber compositions.

BACKGROUND

High cis polydiene polymers have numerous uses in industry, including use in tire rubber compositions for use in tire components such as tire treads. Modification of such high cis polydiene polymers by certain functionalizing compounds to increase filler-polymer interactions may lead to a polymer with a desirable Mooney viscosity, but also lead to an undesirable increase in cold flow, creating challenges with storage of the modified polymer.

SUMMARY

Disclosed herein are a modified high cis polydiene polymer, processes for preparing the modified high cis polydiene polymer, and tire rubber compositions containing the modified high cis polydiene polymer.

In a first embodiment, a process is provided for preparing a modified high cis polydiene polymer. According to the first embodiment, the process comprises: (a) providing a lanthanide-based catalyst system comprising (i) a lanthanide compound, (ii) an alkylating agent, and (iii) a halogen source, where (iii) may optionally be provided by (i), (ii), or both (i) and (ii); (b) using the catalyst system of (a) to polymerize a quantity of conjugated diene monomer to produce polymer chains with a living end; (c) reacting the living end polymer chains from (b) with a functionalizing compound selected from formula I or formula II, thereby producing an intermediary product including polymer chains end functionalized with a residue from the first functionalizing compound; (d) coupling the intermediary product from (c) using a coupling agent selected from the group consisting of silicon halides, thereby producing a modified high cis polydiene polymer having a cis 1,4-bond content of at least 92%, preferably at least 94%, and a Mooney viscosity $ML_{1+4}$ at 100° C. of at least 40, preferably 45-80.

In a second embodiment, a modified high cis polydiene polymer is provided. According to the second embodiment, the modified high cis polydiene polymer comprises: (a) at least one polymer chain resulting from polymerization of a quantity of conjugated diene monomer and bearing a residue from a functionalizing compound selected from formula I or formula II, and (b) a residue from a coupling agent having at least one polymer chain of (a) bonded thereto, wherein the coupling agent is selected from silicon halides and the residue from the coupling agent has at least one halide replaced by a polymer chain of (a), wherein the modified high cis polydiene has a cis 1,4-bond content of at least 92%, preferably at least 94%, and a Mooney viscosity $ML_{1+4}$ at 100° C. of at least 40, preferably 45-80.

In a third embodiment, a tire rubber composition is provided. According to the third embodiment, the tire rubber composition comprises: (a) 10-100 phr, preferably 30-80 phr of the modified high cis polydiene according to second embodiment, or as produced according to the first embodiment; (b) 0-90 phr, preferably 20-70 phr of at least one diene monomer-containing polymer selected from the group consisting of natural rubber, polyisoprene, styrene-butadiene copolymer, styrene-butadiene-isoprene rubber, isoprene-butadiene rubber and combinations thereof; and (c) 10-100 phr of at least one carbon black filler and 0-100 phr of at least one silica filler. According to the third embodiment, the tire rubber composition is preferably contained in a tire component, more preferably in a tire tread.

DETAILED DESCRIPTION

Disclosed herein are a modified high cis polydiene polymer, processes for preparing the modified high cis polydiene polymer, and tire rubber compositions containing the modified high cis polydiene polymer.

In a first embodiment, a process is provided for preparing a modified high cis polydiene polymer. According to the first embodiment, the process comprises: (a) providing a lanthanide-based catalyst system comprising (i) a lanthanide compound, (ii) an alkylating agent, and (iii) a halogen source, where (iii) may optionally be provided by (i), (ii), or both (i) and (ii); (b) using the catalyst system of (a) to polymerize a quantity of conjugated diene monomer to produce polymer chains with a living end; (c) reacting the living end polymer chains from (b) with a functionalizing compound selected from formula I or formula II, thereby producing an intermediary product including polymer chains end functionalized with a residue from the first functionalizing compound; (d) coupling the intermediary product from (c) using a coupling agent selected from the group consisting of silicon halides, thereby producing a modified high cis polydiene polymer having a cis 1,4-bond content of at least 92%, preferably at least 94%, and a Mooney viscosity $ML_{1+4}$ at 100° C. of at least 40, preferably 45-80.

In a second embodiment, a modified high cis polydiene polymer is provided. According to the second embodiment, the modified high cis polydiene polymer comprises: (a) at least one polymer chain resulting from polymerization of a quantity of conjugated diene monomer and bearing a residue from a functionalizing compound selected from formula I or formula II, and (b) a residue from a coupling agent having at least one polymer chain of (a) bonded thereto, wherein the coupling agent is selected from silicon halides and the residue from the coupling agent has at least one halide replaced by a polymer chain of (a), wherein the modified high cis polydiene has a cis 1,4-bond content of at least 92%, preferably at least 94%, and a Mooney viscosity $ML_{1+4}$ at 100° C. of at least 40, preferably 45-80.

In a third embodiment, a tire rubber composition is provided. According to the third embodiment, the tire rubber composition comprises: (a) 10-100 phr, preferably 30-80 phr of the modified high cis polydiene according to second embodiment, or as produced according to the first embodiment; (b) 0-90 phr, preferably 20-70 phr of at least one diene monomer-containing polymer selected from the group consisting of natural rubber, polyisoprene, styrene-butadiene copolymer, styrene-butadiene-isoprene rubber, isoprene-butadiene rubber and combinations thereof; and (c) 10-100 phr of at least one carbon black filler and 0-100 phr of at least one silica filler. According to the third embodiment, the tire rubber composition is preferably contained in a tire component, more preferably in a tire tread.

Definitions

The terminology as set forth herein is for description of the embodiments only and should not be construed as limiting the invention as a whole.

As used herein, the term "living end" (e.g., living end of a polymer chain) is used to refer to a polymer species having a living end that has not yet been terminated; the living end is capable of reacting with a functionalizing compound and, thus, can be described as reactive.

As used herein, the abbreviation Mn is used for number average molecular weight.

As used herein, the abbreviation Mw is used for weight average molecular weight.

Unless otherwise indicated herein, the term "Mooney viscosity" refers to the Mooney viscosity, $ML_{1+4}$. As those of skill in the art will understand, a rubber composition's Mooney viscosity is measured prior to vulcanization or curing.

As used herein, the term "natural rubber" means naturally occurring rubber such as can be harvested from sources such as *Hevea* rubber trees and non-*Hevea* sources (e.g., guayule shrubs and dandelions such as TKS). In other words, the term "natural rubber" should be construed so as to exclude synthetic polyisoprene.

As used herein, the term "phr" means parts per one hundred parts rubber. The one hundred parts rubber may also be referred to herein as 100 parts of an elastomer component.

As used herein the term "polyisoprene" means synthetic polyisoprene. In other words, the term is used to indicate a polymer that is manufactured from isoprene monomers, and should not be construed as including naturally occurring rubber (e.g., *Hevea* natural rubber, guayule-sourced natural rubber, or dandelion-sourced natural rubber). However, the term polyisoprene should be construed as including polyisoprenes manufactured from natural sources of isoprene monomer.

As used herein, the term "tread," refers to both the portion of a tire that comes into contact with the road under normal inflation and load as well as any subtread.

Processes For Preparing A Modified High Cis Polydiene Polymer

Generally, process of the first embodiment described herein can be considered to be a solution polymerization processes. In this type of polymerization process, the polymerization reaction takes place in organic solvent-based solution. Here, that organic solvent-based solution initially contains a quantity of conjugated diene monomer and a lanthanide-based catalyst system. Generally, according to the processes of the first embodiment, the organic solvent-based solution comprises 20-90% by weight (wt %) organic solvent based on the total weight of the monomer, organic solvent, and polydiene in the solution. Preferably, the organic solvent comprises the predominant component of the solution, i.e., 50-90 wt % organic solvent, and more preferably 70 wt % to 90 wt % organic solvent based on the total weight of the monomer, organic solvent, and polydiene. The solution polymerization processes disclosed herein can be contrasted with gas-type or bulk-type polymerizations, where polymerization is carried out in the absence of any organic solvent or where there is less than 20 wt % organic solvent present based on the total weight of the monomer, organic solvent, and polydiene.

Suitable organic solvents for use in solution polymerization processes according to the first embodiment described herein are those solvents that are inert to the polymerization reaction such that the solvent is not a reactant in the polymerization reaction. Suitable organic solvents include aromatic hydrocarbons, aliphatic hydrocarbons, and cycloaliphatic hydrocarbons. Examples of suitable aromatic hydrocarbon solvents include, but are not limited to benzene, toluene, ethylbenzene, diethylbenzene, naphthalenes, mesitylene, xylenes, and the like. Examples of suitable aliphatic hydrocarbon solvents include, but are not limited to, n-pentane, n-hexane, n-heptane, n-octane, n-nonane, n-decane, isopentane, hexanes, isohexanes, isopentanes, isooctanes, 2,2-dimethylbutane, petroleum ether, kerosene, petroleum spirits, and the like. Non-limiting examples of suitable cycloaliphatic hydrocarbon solvents include cyclopentane, cyclohexane, methylcyclopentane, methylcyclohexane, and the like. Mixtures of the foregoing aromatic hydrocarbon solvents, aliphatic hydrocarbon solvents, and cycloaliphatic hydrocarbon solvents can also be used. In certain embodiments of the first embodiment, the preferred organic solvent includes an aliphatic hydrocarbon solvent, a cycloaliphatic hydrocarbon solvent, or mixtures thereof. Additional useful organic solvents suitable for use in the processes of the first embodiment are known to those skilled in the art.

Solution polymerization processes according to the first embodiment disclosed herein are preferably conducted under anaerobic conditions under a blanket of inert gas, such as nitrogen, argon, or helium. The polymerization temperature may vary widely, ranging from −50° C. to 150° C., with the preferred temperature range being 50° C. to 120° C. The polymerization pressure may also vary widely, ranging from 1 atmosphere (atm) to 30 atm, preferably 1 atm to 10 atm.

A solution polymerization process according to the first embodiment disclosed herein may be conducted as a continuous, a semi-continuous, or a batch process. In a semi-continuous process, the monomer is intermittingly charged to replace the monomer that has already polymerized. The polymerization of a conjugated diene monomer into a high-cis polydiene in accordance with the processes described herein occurs when the monomer and the lanthanide-based catalyst system are all present in the organic solvent-based solution.

Generally, the polymerization process of the first embodiment as disclosed herein can be stopped by adding any suitable terminating agent. Non-limiting examples of suitable terminating agents include protic compounds, such as alcohols, carboxylic acids, inorganic acids, water, and mixtures thereof. Other suitable terminating agents are known to those skilled in the art. Furthermore, once the polymerization has been stopped, the resulting high-cis polydiene can be recovered from the solution using conventional methods, e.g., steam desolventization, coagulation with an alcohol, filtration, purification, drying, etc., known to those skilled in the art.

Lanthanide-Based Catalyst System

As mentioned above, the process of the first embodiment includes the use of (providing) a lanthanide-based catalyst system which comprises: (i) a lanthanide compound, (ii) an alkylating agent, and (iii) a halogen source, where (iii) may optionally be provided by (i), (ii), or both (i) and (ii). The lanthanide-based catalyst system is used to polymerize a quantity of conjugated diene monomer (discussed in more detail below) to produce polymer chains with a living end. Preferably according to the process of the first embodiment, the lanthanide-based catalyst system is pre-formed before being added to any solution of the conjugated diene monomer (although in certain preferred embodiments, a small amount of 1,3-butadiene is added to the mixture of catalyst ingredients during formation of the catalyst system, e.g., a molar ratio of about 1:5 to about 1:100 (e.g., 1:5, 1:10, 1:20, 1:30, 1:40, 1:50, 1:60, 1:70, 1:80, 1:90, or 1:100), preferably about 1:10 to about 1:25 (e.g., 1:10, 1:15, 1:20, or 1:25), with the ratio being based upon the molar amount of lanthanide:molar amount of 1,3-butadiene).

As mentioned above, the lanthanide-based catalyst system employed in the processes of the first embodiment includes a lanthanide compound. Lanthanide compounds useful in the processes of the first embodiment are those compounds that include at least one atom of a lanthanide element. As used herein, "lanthanide element" refers the elements found in the lanthanide series of the Periodic Table (i.e., element numbers 57-71) as well as didymium, which is a mixture of rare-earth elements obtained from monazite sand. In particular, the lanthanide elements as disclosed herein include lanthanum, neodymium, cerium, praseodymium, promethium, samarium, europium, gadolinium, terbium, dysprosium, holmium, erbium, thulium, ytterbium, lutetium, and didymium. Preferably, the lanthanide compound includes at least one atom of neodymium, gadolinium, samarium, or combinations thereof. Most preferably, the lanthanide compound includes at least one atom of neodymium.

The lanthanide atom in the lanthanide compound can be in various oxidation states including, but not limited to, the 0, +2, +3, and +4 oxidation states. In accordance with certain embodiments of the processes of the first embodiment, a trivalent lanthanide compound, where the lanthanide atom is in the +3 oxidation state, is used. Generally, suitable lanthanide compounds for use in the processes of the first embodiment include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Preferably, the lanthanide compound is a lanthanide carboxylate or a lanthanide organophosphonate, more preferably a neodymium carboxylate and most preferably neodymium versatate.

In accordance with certain embodiments of the processes of the first embodiment, the lanthanide compound(s) may be soluble in hydrocarbon solvents such as the aromatic hydrocarbon solvents, aliphatic hydrocarbon solvents, or cycloaliphatic hydrocarbon solvents disclosed herein. Hydrocarbon-insoluble lanthanide compounds, however, can also be useful in the process of the first embodiment, as they can be suspended in the polymerization medium to form the catalytically active species.

For ease of illustration, further discussion of useful lanthanide compounds for use in the processes of the first embodiment will focus on neodymium compounds, although those skilled in the art will be able to select similar compounds that are based upon the other lanthanide metals disclosed herein.

Examples of suitable neodymium carboxylates for use as the lanthanide compound in the processes of the first embodiment include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (i.e., neodymium versatate or $NdV_3$), neodymium naphthenate, neodymium stearate, neodymium oleate, neodymium benzoate, and neodymium picolinate.

Examples of suitable neodymium organophosphates for use as the lanthanide compound in the processes of the first embodiment include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl)phosphate, neodymium (1-methylheptyl) (2-ethylhexyl)phosphate, and neodymium (2-ethylhexyl) (p-nonylphenyl)phosphate.

Examples of suitable neodymium organophosphonates for use as the lanthanide compound in processes of the first embodiment include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl)butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Examples of suitable neodymium organophosphinates for use as the lanthanide compound in the processes of the first embodiment include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl) phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl)(2-ethylhexyl)phosphinate, and neodymium (2-ethylhexyl)(p-nonylphenyl)phosphinate.

Examples of suitable neodymium carbamates for use as the lanthanide compound in the processes of the first embodiment include, but are not limited to, neodymium dimethylcarbamate, neodymium diethylcarbamate, neodymium diisopropylcarbamate, neodymium dibutylcarbamate, and neodymium dibenzylcarbamate.

Examples of suitable neodymium dithiocarbamates for use as the lanthanide compound in the processes of the first embodiment include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Examples of suitable neodymium xanthates for use as the lanthanide compound in the processes of the first embodiment include, but are not limited to, neodymium methylxanthate, neodymium ethylxanthate, neodymium isopropylxanthate, neodymium butylxanthate, and neodymium benzylxanthate.

Examples of suitable neodymium β-diketonates for use as the lanthanide compound in the processes of the first embodiment include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Examples of suitable neodymium alkoxides or aryloxides for use as the lanthanide compound in the processes of the first embodiment include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Examples of suitable neodymium halides for use as the lanthanide compound in the processes of the first embodiment include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), can be employed as an aid for solubilizing this class of neodymium compounds in inert organic solvents. Where lanthanide halides, lanthanide oxyhalides, or other lanthanide compounds containing a halogen atom are used, the lanthanide compound may optionally also provide all or part of the halogen source in the lanthanide-based catalyst system.

As used herein, the term "organolanthanide compound" refers to any lanthanide compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds for use as the lanthanide compound in the processes of the first embodiment include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group or a substituted hydrocarbyl group. In one or more embodiments, hydrocarbyl groups or substituted hydrocarbyl groups useful in the processes of the first embodiment may contain heteroatoms such as, for example, nitrogen, oxygen, boron, silicon, sulfur, and phosphorus atoms.

As mentioned above, the lanthanide-based catalyst system employed in the processes of the first embodiment includes an alkylating agent. In accordance with one or more embodiments of the processes of the first embodiment, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Alkylating agents useful in the processes of the first embodiment include, but are not limited to, organoaluminum and organomagnesium compounds. As used herein, the term "organoaluminum compound" refers to any aluminum-containing compound having at least one aluminum-carbon bond. In one or more embodiments, organoaluminum compounds that are soluble in a hydrocarbon solvent can be used. As used herein, the term "organomagnesium compound" refers to any magnesium-containing compound having at least one magnesium-carbon bond. In one or more embodiments, organomagnesium compounds that are soluble in a hydrocarbon can be used. As will be described in more detail below, certain suitable alkylating agents may be in the form of a halide compound. Where the alkylating agent includes a halogen atom, the alkylating agent may optionally also provide all or part of the halogen source in the lanthanide-based catalyst system.

In one or more embodiments of the processes of the first embodiment, organoaluminum compounds that are utilized include those represented by the general formula $AlR^a_n X_{3-n}$, where each $R^a$ independently is a monovalent organic group that is attached to the aluminum atom via a carbon atom; where each X independently is a hydrogen atom, a halogen atom, a carboxylate group, an alkoxide group, or an aryloxide group; and where n is an integer in the range of from 1 to 3. In one or more embodiments, each $R^a$ independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may optionally contain heteroatoms including, but not limited to, nitrogen, oxygen, boron, silicon, sulfur, and phosphorus atoms.

Examples of types of organoaluminum compounds for use as the alkylating agent in the processes of the first embodiment that are represented by the general formula $AlR^a_n X_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Examples of suitable trihydrocarbylaluminum compounds for use as the alkylating agent in the processes of the first embodiment include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris (1-methylcyclopentyl)aluminum, triphenylaluminum, tri-p-tolylaluminum, tris(2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Examples of suitable dihydrocarbylaluminum hydride compounds for use as the alkylating agent in the processes of the first embodiment include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Examples of suitable hydrocarbylaluminum dihydrides for use as the alkylating agent in the processes include, but are not limited to, ethylaluminum dihydride, n-propylaluminum dihydride, isopropylaluminum dihydride, n-butylaluminum dihydride, isobutylaluminum dihydride, and n-octylaluminum dihydride.

Examples of suitable dihydrocarbylaluminum halide compounds for use as the alkylating agent in the processes of the first embodiment include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Examples of suitable hydrocarbylaluminum dihalide compounds for use as the alkylating agent in the processes of the first embodiment include, but are not limited to, ethylaluminum dichloride, n-propylaluminum dichloride, isopropylaluminum dichloride, n-butylaluminum dichloride, isobutylaluminum dichloride, and n-octylaluminum dichloride.

Examples of other suitable organoaluminum compounds for use as the alkylating agent in the processes of the first embodiment that are represented by the general formula $AlR^a_n X_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the processes of the first embodiment is aluminoxanes. Suitable aluminoxanes include oligomeric linear aluminoxanes, which can be represented by the general formula:

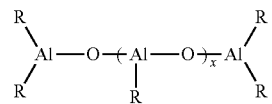

and oligomeric cyclic aluminoxanes, which can be represented by the general formula:

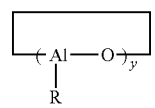

where x is an integer in the range of from 1 to 100 (e.g., 1, 10, 20, 30, 40, 50, 60, 70, 80, 90, or 100), or 10 to 50 (e.g., 10, 15, 20, 25, 30, 35, 40, 45, or 50); y is an integer in the range of from 2 to 100 (e.g., 2, 10, 20, 30, 40, 50, 60, 70, 80, 90 or 100), or 3 to 20 (e.g., 3, 5, 10, 15, or 20); and where each R independently is a monovalent organic group that is attached to the aluminum atom via a carbon atom. In one embodiment of the processes of the first embodiment, each R independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also contain heteroatoms including, but not limited to, nitrogen, oxygen, boron, silicon, sulfur, and phosphorus atoms. As used herein, the number of moles of the aluminoxane refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Examples of suitable aluminoxane compounds for use as the alkylating agent in the processes of the first embodiment include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. In certain preferred embodiments of the processes of the first embodiment, the alkylating agent includes MAO. Modified methylaluminoxane can be formed by substituting from 5 to 80 percent (e.g., 5, 10, 20, 30, 40, 50, 60, 70, or 80 percent) of the methyl groups of methylaluminoxane with $C_2$ to $C_{12}$ hydrocarbyl groups (e.g., $C_2$, $C_3$, $C_4$, $C_5$, $C_6$, $C_7$, $C_8$, $C_9$, $C_{10}$, $C_{11}$ or $C_{12}$), preferably with isobutyl groups, by using techniques known to those skilled in the art.

In accordance with certain embodiments of the processes of the first embodiment, aluminoxanes can be used alone or in combination with other organoaluminum compounds. In one embodiment, methylaluminoxane and at least one organoaluminum compound other than aluminoxane, e.g., an organoaluminum compound represented by $AlR^a{}_nX_{3-n}$, are used in combination as the alkylating agent. In accordance with this and other embodiments, the alkylating agent comprises a dihydrocarbylaluminum hydride, a dihydrocarbylaluminum halide, an aluminoxane, or combinations thereof. For example, in accordance with one embodiment, the alkylating agent comprises diisobutylaluminum hydride, diethylaluminum chloride, methylaluminoxane, or combinations thereof. U.S. Pat. No. 8,017,695, which is incorporated herein by reference in its entirety, provides other examples where aluminoxanes and organoaluminum compounds can be employed in combination.

As mentioned above, suitable alkylating agents used in the processes of the first embodiment include organomagnesium compounds. In accordance with one or more embodiments, of the processes of the first embodiment, suitable organomagnesium compounds include those represented by the general formula $MgR^b{}_2$, where each $R^b$ independently is a monovalent organic group that is attached to the magnesium atom via a carbon atom. In one or more embodiments, each $R^b$ independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also optionally contain heteroatoms including, but not limited to, nitrogen, oxygen, silicon, sulfur, and phosphorus atoms.

Examples of suitable organomagnesium compounds for use as the alkylating agent in the processes of the first embodiment hat are represented by the general formula $MgR^b{}_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds suitable for use as an alkylating agent in accordance with embodiments of the processes of the first embodiment is represented by the general formula $R^cMgX^c$, where $R^c$ is a monovalent organic group that is attached to the magnesium atom via a carbon atom, and X is a hydrogen atom, a halogen atom, a carboxylate group, an alkoxide group, or an aryloxide group. In one or more embodiments, $R^c$ is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also contain heteroatoms including, but not limited to, nitrogen, oxygen, boron, silicon, sulfur, and phosphorus atoms. In one embodiment, $X^c$ is a carboxylate group, an alkoxide group, or an aryloxide group, with each group containing from 1 carbon atom up to 20 carbon atoms (e.g., 2, 3, 4, 5, 6, 7, 8, 9, 10, 11, 12, 13, 14, 15, 16, 17, 18, 19 or 20 carbon atoms).

Examples of suitable types of organomagnesium compounds for use as the alkylating agent in the processes of the first embodiment that are represented by the general formula $R^cMgX^c$ include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Examples of suitable organomagnesium compounds for use as the alkylating agent in the processes of the first embodiment represented by the general formula $R^cMgX^c$ include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the lanthanide-based catalyst systems employed in the processes of the first embodiment include a halogen source. As used herein, the term "halogen source" refers to any substance including at least one halogen atom. In accordance with one or more embodiments of the processes of the first embodiment, all or part of the halogen source may optionally be provided by the lanthanide compound, the alkylating agent, or both the lanthanide compound and the alkylating agent. In other words, the lanthanide compound may serve as both the lanthanide compound and all or at least a portion of the halogen source.

Similarly, the alkylating agent may serve as both the alkylating agent and all or at least a portion of the halogen source.

In accordance with certain embodiments of the processes of the first embodiment, at least a portion of the halogen source may be present in the catalyst system in the form of a separate and distinct halogen-containing compound. Various compounds, or mixtures thereof, that contain one or more halogen atoms can be used as the halogen source. Examples of halogen atoms include, but are not limited to, fluorine, chlorine, bromine, and iodine. A combination of two or more halogen atoms can also be utilized. Halogen-containing compounds that are soluble in an organic solvent, such as the aromatic hydrocarbon, aliphatic hydrocarbon, and cycloaliphatic hydrocarbon solvents disclosed herein, are suitable for use as the halogen source in the processes of the first embodiment. In addition, hydrocarbon-insoluble halogen-containing compounds that can be suspended in a polymerization system to form the catalytically active species are also useful in certain embodiments of the processes of the first embodiment.

Examples of suitable types of halogen-containing compounds for use in the processes of the first embodiment include, but are not limited to, elemental halogens, mixed halogens, hydrogen halides, organic halides, inorganic halides, metallic halides, and organometallic halides. In certain preferred embodiments of the processes of the first embodiment, the halogen-containing compound includes an organometallic halide.

Examples of elemental halogens suitable for use as the halogen source in the processes of the first embodiment include, but are not limited to, fluorine, chlorine, bromine, and iodine. Some specific examples of suitable mixed halogens include, but are not limited to, iodine monochloride, iodine monobromide, iodine trichloride, and iodine pentafluoride.

Examples of suitable hydrogen halides for use as the halogen source in the processes disclosed include, but are not limited to, hydrogen fluoride, hydrogen chloride, hydrogen bromide, and hydrogen iodide.

Examples of suitable organic halides for use as the halogen source in the processes of the first embodiment include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Examples of suitable inorganic halides for use as the halogen source in the processes of the first embodiment include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Examples of suitable metallic halides for use as the halogen source in the processes of the first embodiment include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Examples of suitable organometallic halides for use as the halogen source in the processes of the first embodiment include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide. In accordance with one embodiment, the halogen source comprises an organometallic halide. For example, in accordance with certain embodiments, the halogen source comprises diethylaluminum chloride, which as mentioned above can also serve as an alkylating agent in the lanthanide-based catalyst system. Thus, in accordance with certain embodiments of the processes of the first embodiment, the halogen source may be provided in all or in part by the alkylating agent in the catalyst systems disclosed herein.

The lanthanide-based catalyst system used in the process of the first embodiment may be formed by combining or mixing the foregoing catalyst ingredients. The terms "catalyst composition" and "catalyst system," as referred to herein, encompass a simple mixture of the ingredients, a complex of the various ingredients that is caused by physical or chemical forces of attraction, a chemical reaction product of the ingredients, or a combination of the foregoing. The terms "catalyst composition" and "catalyst system" can be used interchangeably herein.

Conjugated Diene Monomer

As discussed above, according to the processes of the first embodiment, a quantity of conjugated diene monomer is polymerized as part of the process of producing the modified high cis polydiene polymer. A conjugated diene is a compound that has two double carbon-carbon bonds (i.e., two —C=C— bonds) that are separated by a single bond (i.e., —C—C—); thus, a conjugated diene will contain at least one —C=C—C=C— moiety. The particular structure of the conjugated diene monomer used in the process of the first embodiment, present in the polymer chain or contained within the modified high cis polydiene polymer of the first-third embodiments disclosed herein can vary. Preferably, according to the first-third embodiments, the conjugated diene monomer is a 1,3-conjugated diene and in preferred embodiments at least 99% by weight of the conjugated diene monomer is a 1,3-conjugated diene monomer. According to the first-third embodiments, one or more than one type of conjugated diene monomer can be utilized (and thereby present in the resulting polymer) By referring herein to one or more than one type of conjugated diene monomer is meant that the conjugated diene monomers may comprise all one (type) formula or a mixture of (types) formulas. As a non-limiting example, a quantity of conjugated diene monomer containing two types of conjugated diene monomers could include a combination of 1,3-butadiene and isoprene. In certain embodiments of the first-third embodiments disclosed herein, the conjugated diene monomer comprises at least one of 1,3-butadiene; isoprene; 1-3-pentadiene; 2,3-dimethyl-1,3-butadiene; 2-ethyl-1,3-butadiene; 2-methyl-1,3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene. In certain preferred embodiments of the first-third embodiments, the conjugated diene monomer comprises 1,3-butadiene or isoprene, more preferably 1,3-butadiene. In certain embodiments of the first-third embodiments, the conjugated diene monomer comprises 1,3-butadiene in combination with isoprene. In certain particularly preferred embodiments of the first-third embodiments, the only conjugated diene monomer utilized is 1,3-butadiene.

Functionalizing Compound

As discussed above, the process of the first embodiment includes reacting the living end polymer chains with a functionalizing compound selected from formula I or formula II. As also discussed above, according to the second and third embodiments, the modified high cis polydiene includes at least one polymer chain resulting from polymerization of a conjugated diene monomer which bears a residue from the functionalizing compound of formula I or formula II. By referring to the residue from a functionalizing compound is meant to indicate that the polymer chain has bonded to functionalizing compound (the point of bonding or attachment between the polymer chain and the functionalizing compound is discussed in more detail below).

According to the first-third embodiments, structure I is as follows:

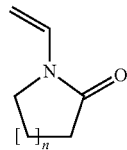

I wherein n is an integer of 0 to 16 (e.g., 0, 1, 2, 3, 4, 5, 6, 7, 8, 9, 10, 11, 12, 13, 14, 15, or 16). In certain embodiments of the first-third embodiments, wherein a functionalizing compound having structure I is utilized, n is preferably an integer of 1 to 10, more preferably 1 to 3. Exemplary compounds having structure I, include, but are not limited to: N-vinylcaprolactam, N-vinylpyrrolidinone (also known as N-vinylpyrrolidinone, 1-vinyl-2-pyrrolidinone and N-vinylpyrrolidone), N-vinylpiperidone (also known as N-vinyl-2-piperidone or 1-vinyl-2-piperidone), N-vinyl-4-butyl pyrrolidone, N-vinyl-4-propyl pyrrolidone, N-vinyl-4-methyl caprolactam, N-vinyl-6-methyl caprolactam, and N-vinyl-7-butyl caprolactam.

According to the first-third embodiments, structure II is as follows

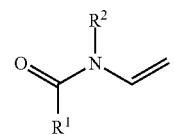

II wherein $R^1$ is selected from H and hydrocarbyl of $C_1$-$C_{20}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$) and $R^2$ is selected from H and hydrocarbyl of $C_1$-$C_{20}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$). In certain preferred embodiments of the first-third embodiments, wherein the functionalizing compound has structure, $R^1$, $R^2$ or both are selected from hydrocarbyl of $C_1$-$C_{10}$, more preferably from hydrocarbyl of $C_1$-$C_4$. According to the first-third embodiments, when $R^1$ and/or $R^2$ are hydrocarbyl, the hydrocarbyl is preferably alkyl and may be linear or branched.

In those embodiments of the first-third embodiments wherein the functionalizing compound has structure I, the polymer chain or chains may be bonded to the beta-carbon from the vinyl group attached to the nitrogen (in which case, the alpha and beta carbons from the vinyl group will no longer be double-bonded) and/or to the carbon of the carbonyl (in which case, that carbon will no longer be double-bonded to the oxygen). The above-described points of attachment of the polymer chain are illustrated below in structures I-A and I-B with the * indicating the point of attachment of the polymer chain to functionalizing compound of structure I.

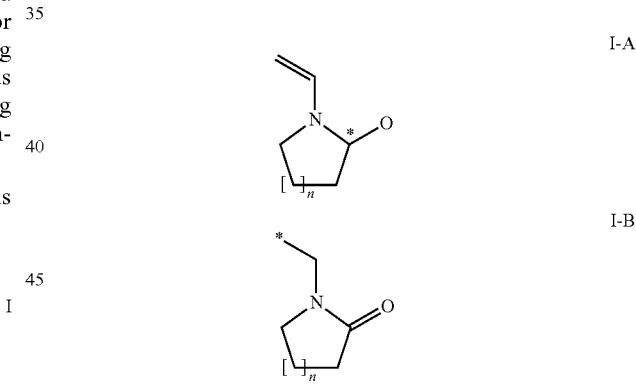

Notably, when a polymer chain or chains bonds to the functionalizing compound as indicated in I-A, the ring may open resulting in a structure I-A1 or I-A2 as illustrated below (which show cisBR as a polymer chain with the remaining portion of the structure being the residue of the functionalizing compound). It should also be noted that more than one polymer chain may bond to the functionalizing compound when the point of attachment is as indicated in I-A which is indicated below in I-A2 where two polymer chains are bonded to the residue of the functionalizing compound.

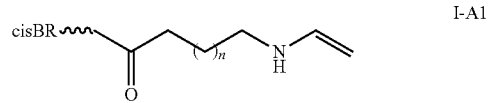

I-A1

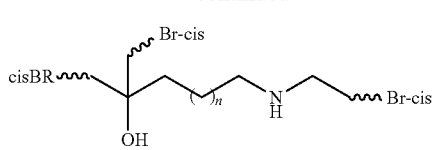

In those embodiments of the first-third embodiments wherein the functionalizing compound has structure II, the polymer chain may be bonded to either the beta-carbon from the vinyl group attached to the nitrogen (in which case, the alpha and beta carbons from the vinyl group will no longer be double-bonded) or to the carbon of the carbonyl (in which case, that carbon will no longer be double-bonded to the oxygen). The above-described points of attachment of the polymer chain are illustrated below in structures II-A and II-B with the * indicating the point of attachment of the polymer chain to a first functionalizing group resulting from a first functionalizing compound of structure II.

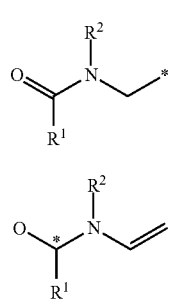

According to the first-third embodiments, the amount of functionalizing compound of formula I or II that is used to modify the living end polymer chains (i.e, according to the process of the first embodiment) or that is present in the modified high cis polydiene polymer as a residue (i.e., according to the second and third embodiments) may vary. In certain embodiments of the first-third embodiments, the functionalizing compound is used in a molar ratio of 10:1 to 100:1 (e.g., 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, or 100:1), preferably 20:1 to 80:1 (e.g., 20:1, 25:1, 30:1, 35:1, 40:1, 45:1, 50:1, 55:1, 60:1, 65:1, 70:1, 75:1, 80:1), more preferably 30:1 to 60:1 (e.g., 30:1, 32:1, 34:1, 35:1, 36:1, 38:1, 40:1, 42:1, 44:1, 45:1, 46:1, 48:1, 50:1, 52:1, 54:1, 55:1, 56:1, 58:1, or 60:1), the molar ratio based upon the moles of functionalizing compound:moles of lanthanide in the lanthanide compound.

Coupling Agent

As discussed above, the process of the first embodiment includes coupling the intermediary product that is produced by reacting the living end polymer chains with a functionalizing compound of formula I or formula II using a coupling agent selected from the group consisting of silicon halides. According to the second and third embodiments, the modified high cis polydiene polymer contains residue from the coupling agent. More specifically, in the modified high cis polydiene polymer according to the first and second embodiment, the residue from the coupling agent has at least one polymer chain bonded thereto (the polymer chain referring to the polymer chains that result from reaction with a functionalizing compound of formula I or formula II), wherein the coupling agent is selected from silicon halides and the residue from the coupling agent has at least one halide replaced by a polymer chain of (a). Preferably, according to the first-third embodiments, the coupling agent is a silicon halide.

According to the process of the first embodiment, the coupling agent is added to the polymerization system after the conjugated diene monomer has been polymerized to produce polymer chains having a living end. Thus, according to such a process, the coupling agent is not added to a monomer solution prior to the addition of the lanthanide catalyst system or the components thereof.

According to the first-third embodiments, the particular structure of the silicon halide coupling agent may vary. In certain preferred embodiments of the first-third embodiments, the coupling agent has formula III: $Si(R^*)_n(Y)_{4-n}$ or formula IV: $R^{**}[SiY_3]_2$. According to formula III, each $R^*$ is independently selected from monovalent organic groups having 1 to 20 carbon atoms (e.g., $C_1, C_2, C_3, C_4, C_5, C_6, C_7, C_8, C_9, C_{10}, C_{11}, C_{12}, C_{13}, C_{14}, C_{15}, C_{16}, C_{17}, C_{18}, C_{19}$, or $C_{20}$), preferably 1 to 10 carbon atoms, more preferably 1-6 carbon atoms. According to formula IV, $R^{}$ is a hydrocarbylene group having 1 to 20 carbon atoms (e.g., $C_1, C_2, C_3, C_4, C_5, C_6, C_7, C_8, C_9, C_{10}, C_{11}, C_{12}, C_{13}, C_{14}, C_{15}, C_{16}, C_{17}, C_{18}, C_{19}$, or $C_{20}$), preferably 1 to 10 carbon atoms, more preferably 1-6 carbon atoms. In certain preferred embodiments when the coupling agent has formula IV, the $SiY_3$ groups are not bonded to the same carbon atom which entails $R^{}$ having at least 2 carbon atoms (e.g., 2-20 carbon atoms, preferably 2-10 carbon atoms, more preferably 2-6 carbon atoms). The hydrocarbylene group $R^{}$ may be saturated or unsaturated (i.e., may contain one or more double bonds) and may be aliphatic or aromatic. The hydrocarbylene group of $R^{}$ may be linear or branched. According to formulas III and IV, the coupling agent contains at least one silicon atom (Si); each Y is a halogen atom or an alkoxy of $C_1$-$C_{10}$ (e.g., $C_1, C_2, C_3, C_4, C_5, C_6, C_7, C_8, C_9$, or $C_{10}$), preferably $C_1$-$C_6$, more preferably $C_1$-$C_2$, and n is an integer of 0-3, preferably 0-2. In preferred embodiments of the first-third embodiment, each Y is a halogen. As those of skill in the art will appreciate when n of formula III is 0 and Y is a halogen, the coupling agent contains four halogens and can be referred to as metal tetrahalide. According to formula III, $R^*$ can be selected from alkyl groups and aryl organic groups, having a number of carbon atoms as indicated above. Preferably, the halogen in either formula III or IV is chlorine or bromine, most preferably chlorine.

In those embodiments of the first-third embodiments wherein the coupling agent has formula III and is a silicon halide, non-limiting examples of suitable coupling agents include diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like.

In those embodiments of the first-third embodiments wherein the coupling agent has formula IV and M is silicon, non-limiting examples of suitable coupling agents include 1,1-bis(trichlorosilylmethyl)ethylene, 1,1-bis(trimethoxysilylmethyl)ethylene, 1,3-bis(trichlorosilyl)propane, bis(trichlorosilyl)methane, 1,2-bis(trichlorosilyl)ethane, 1,6-bis(tricholorosilylmethyl)hexane, 1,6-bis(trichlorosilyl)hexane, 1,10-bis(trichlorosilyl)decane, 1,2-bis(trichlorosilyl)decane, 1,2-bis(trichlorosilyl)ethane, 1,4-bis(trichlorosilyl)benzene, 1,4-bis(trichlorosilylethyl)benzene, 1,4-bis(trichlorosilylmethyl)benzene, 1,4-bis(trichlorosilylpropyl)benzene and the like. Certain suitable coupling agents are available from Gelest, Inc. (Morrisville, Pennsylvania).

According to the first-third embodiments, the amount of coupling agent that is used to couple the intermediary product that is produced by reacting the living end polymer chains with a functionalizing compound of formula I or formula II (i.e, according to the process of the first embodiment) using a coupling agent selected from the group consisting of silicon halides or that is present in the modified high cis polydiene polymer as a residue (i.e., according to the second and third embodiments) may vary. In certain embodiments of the first-third embodiments, the coupling agent is used in a molar ratio of 0.2:1 to 10:1 (e.g., 0.2:1, 0.5:1, 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, or 10:1), preferably 1:1 to 5:1 (e.g., 1:1, 1.5:1, 2:1, 2.5:1, 3:1, 3.5:1, 4:1, 4.5:1, 5:1), the molar ratio based upon the moles of coupling agent:moles of lanthanide in the lanthanide compound.

Properties of the Modified High Cis Polydiene Polymer

As mentioned above, the process of the first embodiment results in a modified high cis polydiene polymer having a cis 1,4-bond content of at least 92%, preferably at least 94%, and a Mooney viscosity $ML_{1+4}$ at 100° C. of at least 40, preferably 45-80. As also mentioned above, the modified high cis polydiene polymer of the second embodiment has a cis 1,4-bond content of at least 92%, preferably at least 94%, and a Mooney viscosity $ML_{1+4}$ at 100° C. of at least 40, preferably 45-80. The modified high cis polydiene polymer of the second embodiment may be prepared using the process of the first embodiment. Accordingly, the discussion above with respect to certain embodiments of the first embodiment should be understood to apply as fully as possible to the polymer of the second embodiment as well as to the polymer used in the composition of the third embodiment. Since the tire rubber composition of the third embodiment utilizes either the modified high cis polydiene polymer of the second embodiment or a modified high cis polydiene polymer made by a process according to the first embodiment, the modified high cis polydiene polymer of the third embodiment can also be understood as having a cis 1,4-bond content of at least 92%, preferably at least 94%, and a Mooney viscosity $ML_{1+4}$ at 100° C. of at least 40, preferably 45-80. By stating that the cis 1,4-bond content is at least 92% is meant that it is 92% or higher (e.g., 92%, 93%, 94%, 95%, 96%, 97%, 98%, 98.5%, 99% or higher) which should be understood to include ranges such as 92-99%, 92-98%, 92-97%, 92-96%, 92-95%, etc. In preferred embodiments of the first-third embodiments, the cis 1,4-bond content of the modified high cis polydiene polymer is at least 94%. By stating that the cis 1,4-bond content is at least 94% is meant that it is 94% or higher (e.g., 94%, 95%, 96%, 97%, 98%, 98.5%, 99% or higher) which should be understood to include ranges such as 94-99%, 94-98%, 94-97%, 94-96%, 94-95%, etc. The cis 1,4-bond contents referred to herein are determined by FTIR (Fourier Transform Infrared Spectroscopy). In particular, a polymer sample is dissolved in $CS_2$ and then subjected to FTIR. By stating that the Mooney viscosity $ML_{1+4}$ at 100° C. is at least 40 is meant that it is 40 or higher (e.g., 40, 45, 50, 55, 60, 65, 70, 75, 80, 85, 90, 95, 100, or more). Preferably according to the first-third embodiments, the Mooney viscosity $ML_{1+4}$ at 100° C. is no more than 100, preferably 45-80 (e.g., 45, 46, 48, 50, 52, 54, 55, 56, 58, 60, 62, 64, 65, 68, 70, 72, 74, 75, 76, 78, or 80) or 40-80 (e.g., 40, 42, 44, 45, 46, 48, 50, 52, 54, 55, 56, 58, 60, 62, 64, 65, 68, 70, 72, 74, 75, 76, 78, or 80).

According to the first-third embodiments, other properties of the modified high cis polydiene polymer may vary. For example, the polymer may have various Mw, Mn and Mw/Mn values. In certain embodiments of the first-third embodiments, the modified high cis polydiene polymer meets at least one of the following: (a) has a Mw of 150,000 to 400,000 grams/mole (e.g., 150,000; 175,000; 200,000; 225,000; 250,000; 275,000; 300,000; 325,000; 350,000; 375,000; or 400,000 grams/mole), preferably 200,000 to 350,000 grams/mole (e.g., 200,000; 225,000; 250,000; 275,000; 300,000; 325,000; or 350,000 grams/mole), more preferably 220,000 to 300,000 grams/mole (e.g., 220,000; 225,000; 250,000; 275,000; or 300,000 grams/mole); (b) has a Mn of 80,000 to 250,000 grams/mole (e.g., 80,000; 90,000; 100,000; 110,000; 120,000; 130,000; 140,000; 150,000; 160,000; 170,000; 180,000; 190,000; or 200,000 grams/mole), preferably 90,000 to 200,000 grams/mole (e.g., 90,000; 100,000; 110,000; 120,000; 130,000; 140,000; 150,000; 160,000; 170,000; 180,000; 190,000; or 200,000 grams/mole), more preferably 100,000 to 150,000 grams/mole (e.g., 100,000; 110,000; 120,000; 130,000; 140,000; 150,000; 160,000; 170,000; or 180,000 grams/mole); (c) has a Mw/Mn of 1.5 to 3.5 (e.g., 1.5, 1.7, 1.9, 2.1, 2.3, 2.5, 2.7, 2.9, 3.1, 3.3, or 3.5), preferably 1.8 to 3 (e.g., 1.8, 2, 2.2, 2.4, 2.6, 2.8, or 3), more preferably 2 to 2.5 (e.g., 2, 2.1, 2.2, 2.3, 2.4, or 2.5); or (d) has a Mooney viscosity $ML_{1+4}$ at 100° C. of 40 to 80 (e.g., 40, 45, 50, 55, 60, 65, 70, 75, or 80). In certain embodiments of the first-third embodiments, the modified high cis polydiene polymer meets each of (a)-(d). In certain embodiments of the first-third embodiments, the modified high cis polydiene polymer satisfies the preferred ranges of each of (a)-(d). In certain embodiments of the first-third embodiments, the modified high cis polydiene polymer satisfies the more preferred ranges of each of (a)-(d). Mn indicates the number average molecular weight in grams/mole (by GPC), Mw indicates the weight average molecular weight in grams/mole (by GPC), and Mw/Mn the molecular weight distribution or polydispersity of the polymer. Generally, the Mn and Mw of these polymers may be determined by using gel permeation chromatography (GPC) calibrated with polystyrene standards and Mark-Houwink constants for the polymer in question.

Tire Rubber Compositions

As discussed above, the third embodiment disclosed herein is directed to a tire rubber composition which includes the modified high cis polydiene polymer of the second embodiment or a modified high cis polydiene polymer produced by the process of the first embodiment. More specifically, the tire rubber composition of the third embodiment comprises: (a) 10-100 phr, preferably 30-80 phr of the modified high cis polydiene according to second embodiment, or as produced according to the first embodiment; (b) 0-90 phr, preferably 20-70 phr of at least one diene monomer-containing polymer selected from the group consisting of natural rubber, polyisoprene, styrene-butadiene copolymer, styrene-butadiene-isoprene rubber, isoprene-butadiene rubber and combinations thereof; and (c) 10-100 phr of at least one carbon black filler and 0-100 phr of at least one silica filler. According to the third embodiment, the tire rubber composition is preferably contained in a tire component, more preferably in a tire tread. Thus, also disclosed herein is a tire tread made from a rubber composition according to the third embodiment.

As mentioned above, according to the third embodiment, the amount of the modified high cis polydiene (a) that is present in the rubber composition may vary from 10-100 phr (e.g., 10, 15, 20, 25, 30, 35, 40, 45, 50, 55, 60, 65, 70, 75, 80, 85, 90, 95 or 100 phr). In certain preferred embodiments of the third embodiment, the amount of the modified high cis polydiene (a) that is present in the rubber composition is 30-80 phr (e.g., 30, 35, 40, 45, 50, 55, 60, 65, 70, 75, or 80 phr). Amounts of (a) within the foregoing range may also be utilized in the rubber composition of the third embodiment, e.g., 40-80 phr, 50-80 phr, 40-70 phr, 40-60 phr, etc.

Other Rubbers For The Tire Rubber Composition

As also mentioned above, according to the third embodiment, the rubber composition can include 0-80 phr (e.g., 0, 5, 10, 15, 20, 25, 30, 35, 40, 45, 50, 55, 60, 65, 70, 75, or 80 phr) of at least one diene monomer-containing polymer selected from the group consisting of natural rubber, polyisoprene, styrene-butadiene copolymer, styrene-butadiene-isoprene rubber, isoprene-butadiene rubber and combinations thereof. In preferred embodiments of the third embodiment, the at least one diene monomer-containing polymer (b) is selected from the group consisting of styrene-butadiene copolymer, natural rubber, polyisoprene, or a combination thereof. In certain preferred embodiments of the third embodiment, the amount of the at least one diene-monomer-containing polymer (b) is 20-70 phr (e.g., 20, 25, 30, 35, 40, 45, 50, 55, 60, 65, or 70 phr). Amounts of (b) within the foregoing range may also be utilized in the rubber composition of the third embodiment, e.g., 20-60, 20-50, 30-60, 40-60, etc. In certain embodiments of the third embodiment, the rubber composition includes one or more additional rubbers, i.e., in addition to (a) and (b). In preferred embodiments of the third embodiment, the entire 100 phr of the elastomer component for the rubber composition is comprised of a combination of (a) and (b). In other words, in such embodiments, no other rubber is present other than (a) and (b). In certain embodiments of the third embodiment, the rubber composition contains no polyisoprene (i.e., 0 phr of polyisoprene). In certain embodiments of the third embodiment, the rubber composition contains no polybutadiene other a modified high cis polybutadiene according to (a). In certain embodiments of the third embodiment, the rubber composition contains no natural rubber and no polyisoprene.

Fillers For The Tire Rubber Composition

As discussed above, according to the third embodiment, the tire rubber composition also includes as a filler component 10-100 phr (e.g., 10, 15, 20, 25, 30, 35, 40, 45, 50, 55, 60, 65, 70, 75, 80, 85, 90, 95, or 100 phr) of at least one carbon black filler and 0-100 phr (e.g., 10, 15, 20, 25, 30, 35, 40, 45, 50, 55, 60, 65, 70, 75, 80, 85, 90, 95, or 100 phr) of at least one silica filler. In other words, according to the foregoing, the carbon black filler can be regarded as always being present whereas the silica filler is optionally present. According to preferred embodiments of the third embodiment, both the carbon black filler and any silica filler that are present are reinforcing fillers. In certain embodiments of the third embodiment, the silica filler is present in an amount of at least 5 phr, 5-200 phr, 5-150 phr, 5-100 phr, at least 20 phr, 20-200 phr, 20-150 phr, 20-100 phr, at least 50 phr, 50-200 phr, 50-150 phr, 50-100 phr, or an amount within one of the foregoing ranges.

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the third embodiment disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the third embodiment disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

According to the third embodiment, the particular type or types of carbon black utilized may vary. Generally, suitable carbon blacks for use as a reinforcing filler in the rubber composition of the third embodiment include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the third embodiment, the rubber composition includes a mixture of two or more of the foregoing blacks. Preferably according to the third embodiment, if a carbon black filler is present it consists of only one type (or grade) of reinforcing carbon black. Typical suitable carbon blacks for use in certain embodiments of the third embodiment are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

When a reinforcing silica filler is utilized in the tire rubber composition of the third embodiment, the particular type of silica for the at least one reinforcing silica filler may vary. Non-limiting examples of reinforcing silica fillers suitable for use in certain embodiments of the third embodiment include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the third embodiment include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the third embodiment disclosed herein, the rubber composition comprises a reinforcing silica filler having a surface area (as measured by the BET method) of 100 $m^2/g$ to 400 $m^2/g$ (e.g., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 $m^2/g$), 150 $m^2/g$ to 350 $m^2/g$, 200 $m^2/g$ to 300 $m^2/g$, or 150 $m^2/g$ to 250 $m^2/g$.

In certain embodiments of the third embodiment disclosed herein, the rubber composition comprises reinforcing silica filler having a pH of 5.5 to 8 (e.g., 5.5, 5.7, 5.9, 6.1, 6.3, 6.5, 6.7, 6.9, 7.1, 7.3, 7.5, 7.7, 7.9, or 8), 6 to 8 (e.g., 6, 6.2, 6.4, 6.6, 6.8, 7, 7.2, 7.4, 7.6, 7.8, or 8), 6 to 7.5, 6.5 to 8, 6.5 to 7.5, or 5.5 to 6.8. Some of the commercially available reinforcing silica fillers which can be used in certain embodiments of the third embodiment include, but are not limited to, Hi-Sil® EZ120G, Hi-Sil® EZ120G-D, Hi-Sil® 134G, Hi-Sil® EZ 160G, Hi-Sil® EZ 160G-D, Hi-Sil® 190, Hi-Sil® 190G-D, Hi-Sil® EZ 200G, Hi-Sil® EZ 200G-D, Hi-Sil® 210, Hi-Sil® 233, Hi-Sil® 243LD, Hi-Sil® 255CG-D, Hi-Sil® 315-D, Hi-Sil® 315G-D, Hi-Sil® HDP 320G and the like, produced by PPG Industries (Pittsburgh, Pa.) As well, a number of useful commercial grades of different reinforcing silica fillers are also available from Evonik Corporation (e.g., Ultrasil® 320 GR, Ultrasil® 5000 GR, Ultrasil® 5500 GR, Ultrasil® 7000 GR, Ultrasil® VN2 GR, Ultrasil® VN2, Ultrasil® VN3, Ultrasil® VN3 GR, Ultrasil® 7000 GR, Ultrasil® 7005, Ultrasil® 7500 GR, Ultrasil® 7800 GR, Ultrasil® 9500 GR, Ultrasil® 9000 G, Ultrasil® 9100 GR), and Solvay (e.g., Zeosil® 1115MP, Zeosil® 1085GR, Zeosil® 1165MP, Zeosil® 1200MP, Zeosil® Premium, Zeosil® 195HR, Zeosil® 195GR, Zeosil® 185GR, Zeosil® 175GR, and Zeosil® 165 GR).

In certain embodiments of the third embodiment, one or more than one silica coupling agent may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the third embodiment include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

When a silica coupling agent is utilized in a tire rubber composition according to the third embodiment, the amount used may vary. In certain embodiments of the third embodiment, the rubber composition does not contain any silica coupling agent. In other embodiments of the third embodiment, the silica coupling agent is present in an amount sufficient to provide a ratio of the total amount of silica coupling agent to silica filler of 0.1:100 to 1:5 (i.e., 0.1 to 20 parts by weight per 100 parts of silica), 1:100 to 1:10, 1:100 to 1:20, and 1:100 to 1:25 as well as about 1:100 to about 0:100 and 1:100 to 0:100. In certain embodiments according to the third embodiment, the tire rubber composition comprises a silica coupling agent in an amount of 0.1 to 15 phr (e.g., 0.1, 0.5, 1, 2, 3, 4, 5, 6, 7, 8, 9, 10, 11, 12, 13, 14, or 15 phr), 0.1 to 12 phr, 0.1 to 10 phr, 0.1 to 5 phr, 1 to 15 phr (e.g., 1, 2, 3, 4, 5, 6, 7, 8, 9, 10, 11, 12, 13, 14, or 15 phr), 1 to 10 phr (e.g., 1, 1.5, 2, 2.5, 3, 3.5, 4, 4.5, 5, 5.5, 6, 6.5, 7, 7.5, 8, 8.5, 9, 9.5, or 10 phr), 1 to 5 phr, or 1 to 3 phr.

Plasticizers For The Tire Rubber Composition

In certain embodiments of the third embodiment, the tire rubber composition further comprises (also includes) a plasticizing system including at least one of a hydrocarbon resin and an oil.

Various types of oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil having an oleic acid content of at least 60%, at least 70% or at least 80%), safflower oil, corn oil, linseed oil, cotton seed oil, rapeseed oil, cashew oil, sesame oil, camellia oil, jojoba oil, macadamia nut oil, coconut oil, and palm oil. Generally, for most applications the total amount of oil used in the tire rubber composition ranges from 1 to 70 phr (e.g., 1, 2,3, 4, 5, 10, 15, 20, 25, 30, 35, 40, 45, 50, 55, 60, 65 or 70 phr), 2 to 60 phr, 3 to 50 phr. In certain embodiments of the third embodiment, the tire rubber composition includes only a limited amount of oil such as less than 10 phr (e.g., 9, 8, 7, 6, 5, 4, 3, 2, 1, or 0 phr), less than 5 phr, 1-5 phr, or even 0 phr.

Various types of hydrocarbon resins may be utilized including plasticizing resins. As used herein, the term plasticizing resin refers to a compound that is solid at room temperature (23° C.) and is miscible in the rubber composition at the amount used which is usually at least 5 phr. In certain embodiments of the third embodiment, the rubber composition comprises about 5 to about 60 phr (e.g., 5, 10, 15, 20, 25, 30, 35, 40, 45, 50, 55, or 60 phr), 5 to 60 phr, 5 to 20 phr, about 25 to about 60 phr, 25 to 60 phr, or 30 to 50 phr of at least one resin; in certain such embodiments the at least one hydrocarbon resin is a plasticizing resin. Generally, the plasticizing resin will act as a diluting agent and can be contrasted with tackifying resins which are generally immiscible and may migrate to the surface of a rubber composition providing tack. In certain embodiments of the third embodiment, wherein a plasticizing resin is utilized, it comprises a hydrocarbon resin and may be aliphatic type, aromatic type or aliphatic/aromatic type depending on the monomers contained therein. Examples of suitable plasticizing resins for use in the rubber compositions of the third embodiment include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins. Such resins may be used, for example, individually or in combination. In certain embodiments of the third embodiment, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mvv/Mn and Mvv is the weight-average molecular weight of the resin. Tg of the resin can be measured by DSC (Differential Scanning calorimetry) according to ASTM D3418 (1999). Mw, Mn and PI of the resin may be determined by size exclusion chromatography (SEC), using THF, 35° C.; concentration 1 g/1; flow rate 1 milliliters/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

Cure Package For The Tire Rubber Composition

In certain embodiments of the third embodiment, the tire rubber composition further comprises (also includes) a cure package. Generally, a cure package will include at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the first-fourth embodiments, include but are not limited to, sulfur or peroxide-based curing components. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. Generally, the vulcanizing agents may be used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr (e.g., 0.1, 0.5, 1, 1.5, 2, 2.5, 3, 3.5, 4, 4.5, 5, 5.5, or 6 phr), preferably 0.5 to 4 phr (e.g., 0.5, 1, 1.5, 2, 2.5, 3 3.5, or 4 phr).

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor used is 0.1 to 3 phr, preferably 0.5 to 2 phr.

Other Ingredients For The Tire Rubber Composition

Various other ingredients that may optionally be added to the tire rubber compositions of the third embodiment disclosed herein include waxes, processing aids, tackifying resins, reinforcing resins, and peptizers, and antioxidants.

In certain preferred embodiments of the third embodiment, the tire rubber composition is free of (i.e., contains less than 0.1 phr or more preferably 0 phr) a metal salt of a fatty acid having 1-36 carbon atoms (or 5-25 or 10-20 carbon atoms). Exemplary such fatty acid salts include salts of the following fatty acids: formic acid, acetic acid, propionic acid, butyric acid, valeric acid, octanoic acid, dodecanoic acid, octanoic acid, stearic acid, lauric acid, oleic acid, and eicosanoic acid. Exemplary such fatty acids include those with alkali metal, alkaline earth metal, or transition metal such as the following: lithium, sodium, potassium, rubidium, cesium, beryllium, magnesium, calcium, strontium, and barium.

In certain preferred embodiments of the third embodiment, the tire rubber composition is free of (i.e., contains less than 0.1 phr or more preferably 0 phr) of an aliphatic primary amine or alicyclic primary amine compound. Such amine compounds are known for use in rubber compositions to produce improved elongation at break properties. Exemplary such amines include heptylamine, stearylamine, dodecylamine, cyclohexylamine, and 2-ethylhexylamine.

In certain particularly preferred embodiments of the third embodiment, the tire rubber composition is free of both the above-described metal salt of a fatty acid and the aliphatic primary amine/alicyclic primary amine compound.

Methods for Preparing Rubber Compositions

Rubber compositions according to the third embodiment disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the third embodiment, one non-productive master-batch mixing stage may be used in preparing the rubber composition. In certain embodiments of the third embodiment, more than one non-productive master-batch mixing stage is used. In certain embodiments of the third embodiment where silica and silica coupler is utilized, more than one non-productive master-batch mixing stage is used and at least a portion of the silica filler is added in a second non-productive master-batch mixing stage (also described as a re-mill stage); in certain such embodiments, all silica coupling agent is added only in the second non-productive master-batch mixing stage (along with at least a portion of the silica filler) and no silica coupling agent is added in an initial non-productive master-batch mixing stage.

In certain embodiments of third embodiment, the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixing being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

In certain embodiments of the third embodiment, the rubber composition is prepared by a process with the non-productive master batch mixing stage(s) conducted at a temperature of about 130° C. to about 200° C. In certain embodiments of the third embodiment, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that modified high cis polydiene polymers made using different conjugated diene monomer(s), using/having different functional compounds (i.e., according to structure I or structure II, as discussed above), and using/having different coupling agents (as discussed above), or using/having different combinations of the functional compound and coupling agent can be prepared and used in rubber compositions. It should also be understood that the high cis polydiene polymer or other such polymers (as mentioned in the foregoing) can be utilized in rubber compositions along with ingredients (e.g., additional rubber(s), fillers, cure package ingredients) that differ in relative amount, composition, or both from those used in the examples (i.e., as fully as disclosed in the preceding paragraphs).

As explained in detail below, high cis polydiene polymers were produced in Examples 1-4. Example 4 can be considered to be a modified high cis polydiene polymer exemplary of the second embodiment and produced according to processes that are exemplary of the first embodiment whereas Examples 1-3 should be considered as comparative or control examples. The polymers produced in Examples 1-4 were then used to prepare rubber compositions in Example 5. Rubber composition 5-4 can be considered as exemplary of the third embodiment disclosed herein whereas Examples 5-1, 5-2 and 5-3 should be considered as comparative or control examples.

General Polymerization Procedure

Example 1: To a dry 2-gallon reactor purged with nitrogen was added 1184 grams of hexane and 2893 grams of 21.4 weight % 1,3-butadiene (Bd) solution in hexane, resulting in a 15.0 weight % Bd solution in hexane (4128 grams or 11.45 moles Bd). The solution was maintained at 22° C. A preformed catalyst was prepared by mixing 7.17 milliliters of 4.32 Molar (M) methylaluminoxane in toluene, 1.7 grams of 21.4 weight % 1,3-butadiene in hexane, 0.61 milliliters of 0.508 M neodymium versatate in cyclohexane, 6.31 milliliters of 1.03 M diisobutylaluminum hydride in hexane, and 1.16 milliliters of 1.07 M diethylaluminum chloride in hexane. The catalyst was aged for 20 minutes and charged into the reactor. The reactor jacket temperature was then set to 65° C. About 60 minutes after addition of the catalyst, the polymerization mixture was cooled to room temperature. The resulting polymer cement was quenched and coagulated with 12 liters of isopropanol containing 5 grams of 2,6-di-tert-butyl-4-methylphenol and then drum-dried. The Mooney viscosity ($ML_{1+4}$) of the resulting polymer was determined at 100° C. by using an Alpha Technologies Mooney viscometer with a large rotor, a one-minute warm-up time, and a four-minute running time. The molecular weight and polydispersity were determined by gel permeation chromatography (GPC). The polymer microstructure of the polymer was measured by infrared spectroscopic analysis. The properties of the resulting polymer are summarized in Table 1.

Example 2: To a dry 2-gallon reactor purged with nitrogen was added 1294 grams of hexane and 2695 grams of 21.8 weight % 1,3-butadiene (Bd) solution in hexane, resulting in a 15.0 weight % Bd solution in hexane (4309 grams or 11.95 moles Bd). The solution was maintained at 22° C. A preformed catalyst was prepared by mixing 5.69 milliliters of 4.32 M methylaluminoxane in toluene, 1.5 grams of 21.8 weight % 1,3-butadiene in hexane, 0.48 milliliters of 0.508 M neodymium versatate in cyclohexane, 5.01 milliliters of 1.03 M diisobutylaluminum hydride in hexane, and 0.92 milliliters of 1.07 M diethylaluminum chloride in hexane. The catalyst was aged for 20 minutes and charged into the reactor. The reactor jacket temperature was then set to 65° C. About 60 minutes after addition of the catalyst, the polymerization mixture was cooled to room temperature. The resulting polymer cement was quenched and coagulated with 12 liters of isopropanol containing 5 grams of 2,6-di-tert-butyl-4-methylphenol and then drum-dried. The properties of the resulting polymer are summarized in Table 1.

Example 3: To a dry 2-gallon reactor purged with nitrogen was added 1308 grams of hexane and 2951 grams of 21.9 weight % 1,3-butadiene (Bd) solution in hexane, resulting in a 16.5 weight % Bd solution in hexane (4309 grams or 11.95 moles Bd). The solution was maintained at 22° C. A preformed catalyst was prepared by mixing 7.48 milliliters of 4.32 M methylaluminoxane in toluene, 1.7 grams of 21.9 weight % 1,3-butadiene in hexane, 0.64 milliliters of 0.508 M neodymium versatate in cyclohexane, 6.59 milliliters of 1.03 M diisobutylaluminum hydride in hexane, and 1.21 milliliters of 1.07 M diethylaluminum chloride in hexane. The catalyst was aged for 20 minutes and charged into the reactor. The reactor jacket temperature was then set to 65° C. About 60 minutes after addition of the catalyst, about 175 grams of the pseudo-living polymer cement was dropped into a nitrogen purged bottle, followed by coagulation with isopropanol and dried on a drum-drier. The base polymer had ML of 31.6. To the rest of the polymer cement in the reactor was added 18.5 milliliters of 1.0 M N-vinylcaprolactam (NVCL) [molar ratio of NVCL/Nd=60] in hexane. The mixture was further agitated for 30 minutes at 65° C. Then about 720 grams of polymer cement was dropped into nitrogen purged bottles and were quenched with 3 milliliters of 12 weight % 2,6-di-tert-butyl-4-methylphenol solution in isopropanol, coagulated with 2 liters of isopropanol containing 0.5 grams of 2,6-di-tert-butyl-4-methylphenol, and then drum-dried. The properties of the resulting NVCL-modified polymer are summarized in Table 1.

Example 4: To the rest of the NVCL modified polymer cement synthesized in Example 3 was added 0.11 milliliters of neat (4.35 M) 1,1-Bis(trichlorosilylmethyl)ethylene. The mixture was agitated for additional 30 minutes at 65° C. and then was cooled down to room temperature. The resulting polymer cement was quenched and coagulated with 12 liters of isopropanol containing 5 grams of 2,6-di-tert-butyl-4-methylphenol and then drum-dried. The properties of the resulting polymer are summarized in Table 1.

TABLE 1

|  | Ex. 1 | Ex. 2 | Ex. 3 | Ex. 4 |
| --- | --- | --- | --- | --- |
| Functionalizing Compound (FC) | None | None | Yes | Yes |
| Coupling agent (CA) | None | None | None | Yes |
| FC:Nd[1] | 0 | 0 | 60 | 60 |
| CA:Nd[2] | 0 | 0 | 0 | 2 |
| $ML_{1+4}$ (100° C.) | 27.9 | 43.0 | 46.8 | 54.5 |
| T80 | 1.66 | 1.84 | 2.22 | 2.85 |
| Mn | 107,356 | 130,122 | 107,486 | 109,685 |
| Mw | 207,385 | 248,461 | 233,760 | 238,613 |
| Mw/Mn | 1.93 | 1.91 | 2.17 | 2.18 |
| Cis-1,4 bond (%)[3] | 94.1 | 94.8 | 94.4 | 94.4 |
| Vinyl bond (%)[3] | 0.61 | 0.59 | 0.62 | 0.62 |

[1] molar ratio of functionalizing compound:neodymium
[2] molar ratio of coupling agent to Nd
[3] measured by FTIR, as described above for cis-1,4 bond measurement Example 5: The polymers produced according to Examples 1-4 were utilized to prepare rubber compositions according to the formulas provided in Table 2 below. The mixing procedure set forth in Table 3 was utilized in preparing the rubber compositions of Example 5.

TABLE 2

| Ingredient | Amount (phr) |
| --- | --- |
| Polymer | 40 |
| Natural rubber | 60 |
| Carbon black (reinforcing) | 44 |
| Wax | 2 |
| Resin | 1 |
| Stearic acid | 2 |
| Antioxidant | 2.3 |
| Final | |
| Sulfur | 1.1 |
| Accelerators | 1.5 |
| Vulcanization inhibitor | 0.1 |
| Zinc oxide | 3.5 |

TABLE 3

Mixing Parameters

| Master-Batch Stage (initial temp: 130° C., rotor rpm started at 60) | 0 seconds | Charge polymers |
|---|---|---|
| | 30 to 150 seconds | Charge any carbon black filler and other master-batch ingredients, increase rotor speed to 90 rpm Drop based on max temperature of 165° C. or 4.5 minutes mixing (whichever comes first) |
| Final Batch Stage (initial temp: 65-70° C., rotor rpm at 45) | 0 seconds | Charge master-batch |
| | 0 seconds | Charge curatives and remaining final ingredients Drop based on max temperature of 100° C. or 2.5 minutes mixing (whichever comes first) |

For each of the rubber compositions of Example 5, the properties listed in Table 4 were determined as follows.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

Tan δ values were measured using a strain sweep test conducted with an Advanced Rheometric Expansion System (ARES) from TA Instruments. The test specimen had a cylindrical geometry having a length of 14.4 mm and a diameter of 7.8 mm. The test was conducted using a frequency of 10 rad/sec. The strain was swept from 0.1% to 16% and the temperature was started at 22° C. and increased to 60° C. and held at 60° C. Measurements at 60° C. at both 2% and 10% strain were recorded for each of the rubber compositions. A rubber composition's tan δ at 60° C. is indicative of its rolling resistance when incorporated into a tire tread. The tan δ values are presented as indexed numbers (calculated by comparing the value for a given example as compared to the value for the control polymer 1) wherein a number above 100 is considered to be an improvement. Since a lower tan δ value at 60° C. is considered to be an improvement, the indexed values were calculated as (control/value)×100.

TABLE 4

Rubber Compositions

| Polymer/ Example # | Compound viscosity G' at 130° C. (kPa) | Indexed Tan δ at 60° C. (2% strain) | Indexed Tan δ at 60° C. (10% strain) | Bound rubber % |
|---|---|---|---|---|
| Example 5-1 | 1 | 55.4 | 100 | 100 | 35.5% |
| Example 5-2 | 2 | 62.4 | 105 | 105 | 36.5% |
| Example 5-3 | 3 | 68.0 | 122 | 120 | 43.2% |
| Example 5-4 | 4 | 68.7 | 118 | 115 | 39.8% |

As can be seen from the data of Table 4, rubber composition 5-4 exhibited improved properties, i.e., tan δ values at 60° C., a higher Mooney viscosity, and a higher bound rubber than the control example 5-1 (using the polymer of Example 1) or the control example 5-2 (using the polymer of Example 2).

Although not reported in the data above, the polymer of Example 4 would have improved cold flow properties as compared to the polymers of Examples 1-3. In other words, the polymer of Example 4 (as compared to the polymer of Examples 1-3) would experience less cold flow. An improvement in cold flow properties can be predicted by a combination of higher Mooney viscosity and higher T80 values. Notably, of the polymers produced in Examples 1-4, the polymer of Example 4 had the highest Mooney viscosity and the highest T80 value (Table 1 values). Thus, the use of a functionalizing compound of formula I (e.g., NVCL) or II in combination with a coupling agent of formula III or IV would produce a modified high cis polybutadiene that has a higher Mooney viscosity and T80 value than a high cis polybutadiene made using only a functionalizing compound of formula I or II (assuming both polymers had the same Mw and Mn values). (The T80 stress relaxation time (T80), for the polymer samples (listed in Table 1) was determined by measuring the time required (in minutes) from the moment when rotation was stopped (during the $ML_{1+4}$ Mooney viscosity testing for the polymers, immediately after measurement of the ML1+4 at 100° C. that was required for the ML1+4 value to decrease 80%.) Generally cold flow of a polymer or rubber composition sample can be measured by subjecting a sample of the given polymer/rubber composition to a compressive force and measuring the height of the sample before and after the compressive force is applied. A sample which experiences less cold flow (or has improved cold flow properties) will maintain more of its original height when subjected to the compressive force. The cold

What is claimed is:

1. A process for preparing a modified high cis polydiene polymer comprising:
   a. providing a lanthanide-based catalyst system comprising (i) a lanthanide compound, (ii) an alkylating agent, and (iii) a halogen source, where (iii) may optionally be provided by (i), (ii), or both (i) and (ii);
   b. using the catalyst system of (a) to polymerize a quantity of conjugated diene monomer to produce polymer chains with a living end;
   c. reacting the living end polymer chains from (b) with a functionalizing compound selected from:
      i.

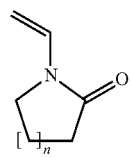

I wherein n is an integer of 0 to 16, or
      ii.

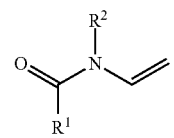

II wherein $R^1$ is selected from H and hydrocarbyl of $C_1$-$C_{20}$, and $R^2$ is selected from H and hydrocarbyl of $C_1$-$C_{20}$, thereby producing an intermediary product including polymer chains end functionalized with a residue from the first functionalizing compound;
   d. coupling the intermediary product from (c) using a coupling agent selected from the group consisting of silicon halides, thereby producing a modified high cis polydiene polymer having a cis 1,4-bond content of at least 92%, and a Mooney viscosity $ML_{1+4}$ at 100° C. of 40-80.

2. The process of claim 1, wherein the quantity of conjugated diene monomer comprises at least 99% by weight of a conjugated 1,3-diene.

3. The process of claim 1, wherein the molar ratio of functionalizing compound to lanthanide from the lanthanide compound is 10:1 to 100:1 and the molar ratio of coupling agent to lanthanide from the lanthanide compound is 0.2:1 to 10:1.

4. The process claim 1, wherein the functionalizing compound has formula (I).

5. The process of claim 4, wherein the functionalizing compound is selected from the group consisting of N-vinylcaprolactam, N-vinylpyrrolidinone (also known as N-vinylpyrrolidinone, 1-vinyl-2-pyrrolidinone and N-vinylpyrrolidone), N-vinylpiperidone (also known as N-vinyl-2-piperidone or 1-vinyl-2-piperidone), N-vinyl-4-butyl pyrrolidone, N-vinyl-4-propyl pyrrolidone, N-vinyl-4- methyl caprolactam, N-vinyl-6-methyl caprolactam, N-vinyl-7-butyl caprolactam, and combinations thereof.

6. The process claim 1, wherein the functionalizing compound has formula (II).

7. The process of claim 1, wherein
the lanthanide compound is selected from the group consisting of lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, organolanthanide compounds, and combinations thereof, and the lanthanide portion of the lanthanide compound is selected from the group consisting of lanthanum, cerium, praseodymium, neodymium, promethium, samarium, europium, gadolinium, terbium, dysprosium, holmium, erbium, thulium, ytterbium, lutetium, didymium, and combinations thereof;
the alkylating agent includes at least one organoaluminum compound, at least one organomagnesium compound, or combinations thereof; and
the halogen source includes an elemental halogen, a mixed halogen, a hydrogen halide, an organic halide, an inorganic halide, a metallic halide, an organometallic halide, or combinations thereof.

8. The process of claim 1, wherein the lanthanide portion of the lanthanide compound is neodymium.

9. The process of claim 1, wherein the modified high cis polydiene polymer meets at least one of the following:
   a. has a Mw of 150,000 to 375,000 grams/mole;
   b. has a Mn of 80,000 to 250,000 grams/mole;
   c. has a Mw/Mn of 1.5 to 3.5; or
   d. has a Mooney viscosity $ML_{1+4}$ at 100° C. of 40 to 80.

10. A modified high cis polydiene polymer comprising
   a. at least one polymer chain resulting from polymerization of a quantity of conjugated diene monomer and bearing a residue from a functionalizing compound selected from
   i.

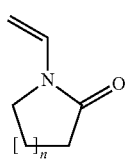

I wherein n is an integer of 0 to 16, or
   ii.

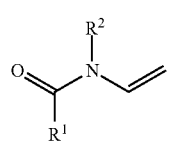

II wherein $R^1$ is selected from H and hydrocarbyl of $C_1$-$C_{20}$, and $R^2$ is selected from H and hydrocarbyl of $C_1$-$C_{20}$,
   b. a residue from a coupling agent having at least one polymer chain of (a) bonded thereto, wherein the coupling agent is selected from silicon halides, and the residue from the coupling agent has at least one halide replaced by a polymer chain of (a),
wherein the modified high cis polydiene has a cis 1,4-bond content of at least 92%, and a Mooney viscosity $ML_{1+4}$ at 100° C. of 40-80.

11. The modified high cis polydiene polymer of claim 10, wherein the polymer chains are based upon at least 99% by weight conjugated 1,3-diene monomer.

12. The modified high cis polydiene polymer of claim 11, wherein the conjugated 1,3-diene monomer consists of 1,3-butadiene.

13. The modified high cis polydiene polymer of claim 10, wherein at least one of the following is met:
   a. the polymer has a Mw of 150,000 to 375,000 grams/mole;
   b. the polymer has a Mn of 80,000 to 250,000 grams/mole;
   c. the polymer has a Mw/Mn of 1.5 to 3.5; or
   d. the polymer has a Mooney viscosity $ML_{1+4}$ at 100° C. of 40 to 80.

14. The modified high cis polydiene polymer of claim 13, wherein each of (a)-(d) are met.

15. The modified high cis polydiene polymer according claim 10, wherein the residue of (a) is from a functionalizing compound of formula (I).

16. The modified high cis polydiene polymer of claim 15, wherein the functionalizing compound of formula (I) is selected from the group consisting of N-vinylcaprolactam, N-vinylpyrrolidinone (also known as N-vinylpyrrolidinone, 1-vinyl-2-pyrrolidinone and N-vinylpyrrolidone), N-vinylpiperidone (also known as N-vinyl-2-piperidone or 1-vinyl-2-piperidone), N-vinyl-4-butyl pyrrolidone, N-vinyl-4-propyl pyrrolidone, N-vinyl-4-methyl caprolactam, N-vinyl-6-methyl caprolactam, N-vinyl-7-butyl caprolactam, and combinations thereof.

17. The modified high cis polydiene polymer of claim 10, wherein the residue of (a) is from a functionalizing compound of formula (II).

18. A tire rubber composition having improved rolling resistance comprising:
   a. 10-100 phr of the modified high cis polydiene polymer according to claim 10, and
   b. 0-90 phr of at least one diene monomer-containing polymer selected from the group consisting of natural rubber, polyisoprene, styrene-butadiene copolymer, styrene-butadiene-isoprene rubber, isoprene-butadiene rubber, and combinations thereof, and
   c. 10-100 phr of at least one carbon black filler and 0-100 phr of at least one silica filler,
wherein the tire rubber composition is contained in a tire tread.

19. The tire rubber composition of claim 18, wherein the modified high cis polydiene polymer has residue from a functionalizing compound of formula (I).

20. The tire rubber composition of claim 18, wherein the modified high cis polydiene polymer has residue from a functionalizing compound of formula (II).

* * * * *